United States Patent
Lee et al.

(10) Patent No.: US 10,061,454 B2
(45) Date of Patent: Aug. 28, 2018

(54) METHOD FOR PRODUCING THIN FILM TOUCH SCREEN PANEL

(71) Applicant: DONGWOO FINE-CHEM CO., LTD., Jeollabuk-do (KR)

(72) Inventors: Dong Hak Lee, Gyeonggi-do (KR); Hyuk Hwan Kwon, Incheon (KR); Woo Hyun Bae, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 0 days.

(21) Appl. No.: 15/126,314

(22) PCT Filed: Mar. 5, 2015

(86) PCT No.: PCT/KR2015/002129
§ 371 (c)(1),
(2) Date: Sep. 15, 2016

(87) PCT Pub. No.: WO2015/152524
PCT Pub. Date: Oct. 8, 2015

(65) Prior Publication Data
US 2017/0083128 A1 Mar. 23, 2017

(30) Foreign Application Priority Data
Mar. 31, 2014 (KR) .......................... 10-2014-0038047

(51) Int. Cl.
*G06F 3/045* (2006.01)
*G06F 3/041* (2006.01)
(Continued)

(52) U.S. Cl.
CPC ................ *G06F 3/044* (2013.01); *B32B 7/00* (2013.01); *B32B 7/12* (2013.01); *B32B 17/064* (2013.01);
(Continued)

(58) Field of Classification Search
CPC ........... G06F 3/041; G06F 3/044; G06F 3/045
See application file for complete search history.

(56) References Cited

U.S. PATENT DOCUMENTS

2011/0262701 A1* 10/2011 Albertelli ................ B29C 43/18
428/147
2011/0273383 A1* 11/2011 Jeon .......................... G06F 3/044
345/173
(Continued)

FOREIGN PATENT DOCUMENTS

CN 103488324 A 1/2014
KR 10-2011-0123987 A 11/2011
(Continued)

OTHER PUBLICATIONS

Office action dated Jun. 5, 2018 from China Patent Office in a counterpart China Patent Application No. 201580018087.8 (all the cited references are listed in this IDS.) (English translation is also submitted herewith.).

*Primary Examiner* — Nan-Ying Yang
(74) *Attorney, Agent, or Firm* — The PL Law Group, PLLC

(57) ABSTRACT

A method for fabricating a thin film touch screen panel includes forming an adhesive layer on a convex portion of an arcuate spherical-shaped glass, adhering a base film on the adhesive layer, and forming a transparent electrode laminate on the base file, wherein the convex portion of the glass is flattened by applying heat to the adhesive layer after forming the adhesive layer or adhering the base film, thereby the transparent electrode laminate may be formed on the straight flattened glass and the base film, and the process of forming the transparent electrode laminate may be more precisely and reliably performed.

17 Claims, 3 Drawing Sheets

(51) Int. Cl.
*G06F 3/044* (2006.01)
*B32B 7/00* (2006.01)
*B32B 7/12* (2006.01)
*B32B 17/06* (2006.01)
*C03C 21/00* (2006.01)
*B32B 37/12* (2006.01)
*B32B 37/00* (2006.01)

(52) U.S. Cl.
CPC ........ *B32B 37/1207* (2013.01); *C03C 21/002* (2013.01); *G06F 3/041* (2013.01); *B32B 37/003* (2013.01); *B32B 2309/02* (2013.01); *B32B 2309/04* (2013.01); *B32B 2309/105* (2013.01); *B32B 2457/208* (2013.01); *G06F 2203/04102* (2013.01); *G06F 2203/04103* (2013.01)

(56) References Cited

U.S. PATENT DOCUMENTS

2012/0320509 A1    12/2012    Kim et al.
2014/0345792 A1*   11/2014    Lee ................... B32B 37/0046
                                                            156/228

FOREIGN PATENT DOCUMENTS

| KR | 10-2012-0040783 A | 4/2012 |
| KR | 10-2012-0088025 A | 8/2012 |
| KR |    2012-0133848 A | 12/2012 |
| KR | 10-2014-0017161 A | 2/2014 |

* cited by examiner

METHOD FOR PRODUCING THIN FILM TOUCH SCREEN PANEL

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2015/002129, filed Mar. 5, 2015, which claims priority to the benefit of Korean Patent Application No. 10-2014-0038047 filed in the Korean Intellectual Property Office on Mar. 31, 2014, the entire contents of which are incorporated herein by reference.

BACKGROUND OF THE INVENTION

1. Field of the Invention

The present invention relates to a method for fabricating a thin film touch screen panel.

2. Description of the Related Art

A touch screen panel is an input device capable of inputting a command of a user by a touch of a specific position displayed on a screen of an image display device, etc., with a finger of the user or an object such as a touch pen or a stylus pen.

For this, in the image display device provided with the touch screen panel on a front face thereof, a force applied to the contact position by a direct touch with the finger of a user or the object is converted to an electrical signal. Therefore, an instruction corresponding to the contact position selected by the user is input to the image display device as an input signal generated by the electrical signal.

Since a separate input device such as a keyboard and a mouse which are connected to the image display device to input an operation command may be replaced by the above-described touch screen panel, it is a recent trend to gradually enlarge the application fields of the touch screen panel.

Various types of touch screen panel such as a resistive film type, surface acoustic wave type using an infrared or ultrasonic wave, capacitance touch type, or the like, are known in the related art for implementing the touch screen panel. Among these, in the capacitance type touch screen panel, when the finger of a user or the object touches a specific position displayed thereon, a change in capacitance formed by conductive sensing patterns with adjacent other sensing patterns or a ground electrode is detected by the image display device equipped with the touch screen panel, and thereby a force applied to the contact position is converted to an electrical signal.

Generally, the above-described touch screen panel is adhered on an outer surface of a flat panel display device such as a liquid crystal display device, or an organic electroluminescence display device to be commercialized in many cases. Accordingly, the touch screen panel needs to have characteristics such as a high transparency and a small thickness.

Recently, a flexible flat panel display device has been developed, and in accordance with this trend, it is necessary for the touch screen panel adhered on the flexible flat panel display device to have flexible characteristics.

However, the capacitance type touch screen panel needs a thin film deposition, pattern formation process, or the like, in order to form sensing patterns, etc., for implementing a touch sensor. Therefore, characteristics such as high heat resistance and chemical resistance, or the like are required. Accordingly, the capacitance type touch screen panel is provided with a transparent electrode laminate which is formed on a base film by applying a resin such as a polyimide resin having excellent heat resistance and curing the same.

On the other hand, such a thin and flexible base film may be easily bent or distorted. Therefore, it is difficult to handle the base film during a manufacturing process thereof, and form the transparent electrode laminate.

As a solution for solving the above-described problem, a method including the processes of forming an adhesive layer on a glass and adhering a base film thereon, and forming a transparent electrode laminate on the base film, and then delaminating the base film from the glass has been proposed. However, in such a case, since the adhesive layer is contracted and/or expanded by thermal and physical energy applied thereto during the adhesive layer forming process and the adhering process, the glass is bent, and thereby it is also difficult to form the transparent electrode laminate similar to as described above.

For example, Korean Patent Laid-Open Publication No. 2012-133848 discloses a flexible touch screen panel with no proposal for solving the above-described problems.

SUMMARY

Accordingly, it is an object of the present invention to provide a method for fabricating a flexible touch screen panel in which a process of forming a transparent electrode laminate may be more precisely and reliably performed.

The above object of the present invention will be achieved by the following characteristics:

(1) A method for fabricating a thin film touch screen panel including: forming an adhesive layer on a convex portion of an arcuate spherical-shaped glass; adhering a base film on the adhesive layer; and forming a transparent electrode laminate on the base file, wherein the convex portion of the glass is flattened by applying heat to the adhesive layer after forming the adhesive layer or adhering the base film.

(2) The method according to the above (1), wherein the arcuate spherical-shaped glass is convex to one side thereof, and has a multidirectional arcuate spherical shape.

(3) The method according to the above (1), wherein the glass is an alkali-free glass, soda lime glass, or chemically-strengthened glass.

(4) The method according to the above (3), wherein the chemically-strengthened glass has a strengthened layer formed thereon with a thickness of 1 to 45 μm.

(5) The method according to the above (1), wherein, when the glass is disposed in such a way that a convex surface thereof faces a bottom, a height of the glass from the bottom to the highest point of a surface on which the convex surface is formed is 100 to 6,000 μm.

(6) The method according to the above (1), wherein the heating process after forming the adhesive layer is performed at a temperature of 60 to 300° C. for 60 to 1,800 seconds.

(7) The method according to the above (1), wherein the heating process after adhering the base film is performed at a temperature of 60 to 300° C. for 60 to 1,800 seconds.

(8) The method according to the above (1), further including: applying a composition for forming an insulation layer or a hard coating layer on one surface of the glass and heating the same so as to form the glass in an arcuate spherical shape before forming the adhesive layer.

(9) The method according to the above (1), further including: chemically strengthening the glass so that strengthened layers formed on both surfaces thereof have different thicknesses from each other so as to form the glass in an arcuate spherical shape before forming the adhesive layer.

(10) The method according to the above (1), further including: delaminating the base film having the transparent electrode laminate formed thereon from the adhesive layer.

According to the present invention, by using the arcuate spherical-shaped glass, it is possible to form the transparent electrode laminate on the straight flattened glass and the base film, and thus more precisely and reliably perform the process of forming the transparent electrode laminate.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

The present invention discloses a method for fabricating a thin film touch screen panel including: forming an adhesive layer on a convex portion of an arcuate spherical-shaped glass; adhering an base film on the adhesive layer; and forming a transparent electrode laminate on the base file, wherein the convex portion of the glass is flattened by applying heat to the adhesive layer after forming the adhesive layer or adhering the base film, thereby the transparent electrode laminate may be formed on the straight flattened glass and the base film, and the process of forming the transparent electrode laminate may be more precisely and reliably performed.

Hereinafter, exemplary embodiments of the present invention will be described in detail with reference to the accompanying drawings.

In the method for fabricating a thin film touch screen panel, first forming an adhesive layer on a convex portion of an arcuate spherical-shaped glass and heating the same, so as to flatten the convex portion of the glass.

Conventionally, when adhering a base film on the glass by an adhesive and forming a transparent electrode laminate on the base film, since the adhesive layer is contracted and/or expanded by heat applied thereto during the adhesive layer forming process and the transparent electrode laminate forming process, the glass is curved, and thereby it is difficult to form the transparent electrode laminate on the base film or forming the transparent electrode laminate itself is impossible.

However, in the present invention, by using the arcuate spherical-shaped glass, and flattening the convex portion of the glass by heating the adhesive layer after forming the adhesive layer or adhering the base file, which will be described below, it is possible to form the transparent electrode laminate on the straight flattened glass and the base film. Thereby, the transparent electrode laminate may be more precisely and reliably formed.

Herein, the glass according to the present invention is an arcuate spherical glass.

More specifically, in the present invention, an arcuate spherical-shaped glass, which is convex to one side thereof and has a multidirectional arcuate spherical shape, is used.

Figure 1:
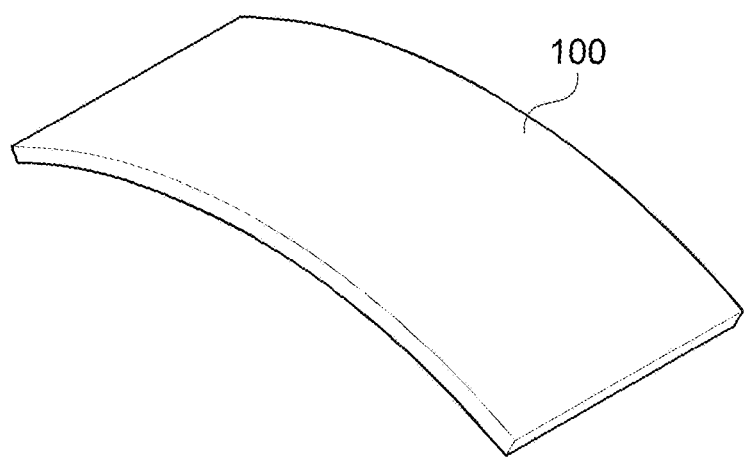
FIG. 1 is a schematic perspective view illustrating an arcuate spherical-shaped glass according to one embodiment of the present invention.
Figure 2:
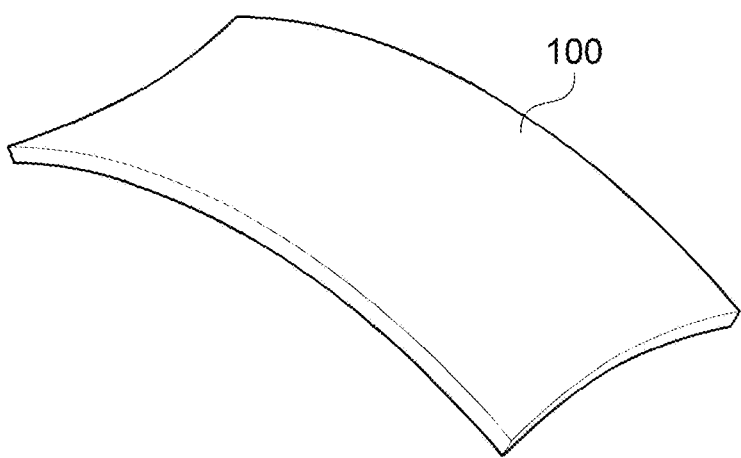
FIG. 2 is a schematic perspective view illustrating an arcuate spherical-shaped glass according to another embodiment of the present invention.

FIGS. 1 and 2 are schematic perspective of an arcuate spherical-shaped glass 100 according to embodiments of the present invention. As illustrated in FIGS. 1 and 2, the glass 100 according to the present invention is convex to only one side (in the case of FIGS. 1 and 2, to a top side) of top and bottom sides thereof. In addition, as illustrated in FIG. 1, the glass 100 according to one embodiment of the present invention may be formed in an arcuate spherical shape in a long axis direction thereof as seen from a front, or as illustrated in FIG. 2, the glass 100 may be formed in an arcuate spherical shape in a multi-direction (at least two direction or more), for example, the long axis, short axis, and diagonal axis directions.

Figure 3:
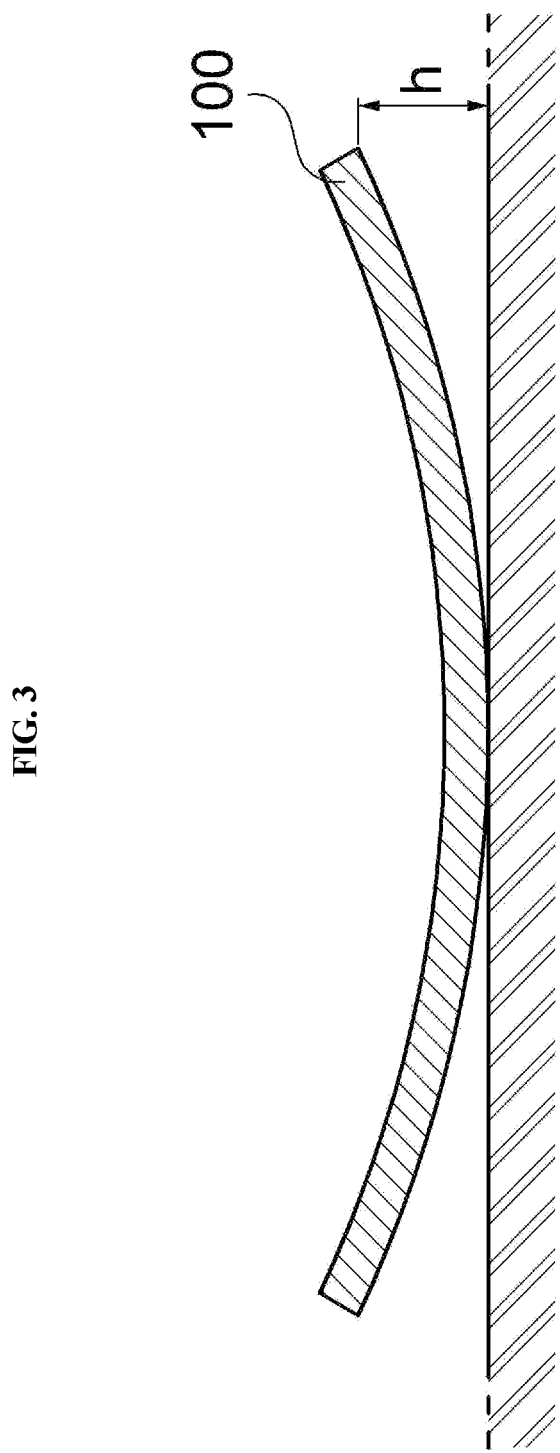
FIG. 3 is a cross-sectional view describing a height h of the glass from a bottom to the highest point of a surface on which a convex surface is formed, when the glass is disposed in such a way that the convex surface thereof faces the bottom.

Convex level of the glass is not particularly limited, and may be properly selected depending on a condition of a heating process for flattening the convex portion to be described below. For example, when the glass 100 is disposed in such a way that the convex surface thereof faces a bottom, a height h illustrated in FIG. 3 from the bottom to the highest point of the convex surface of the glass may be 100 to 6,000 µm. When the convex level of the glass is within the above-described range, the glass may be straight flattened through a heating process to be described below. If the height of the glass from the bottom to the highest point of a surface on which the convex surface is formed is less than 100 µm, the glass becomes rather concave by contraction and/or expansion of the adhesive layer by the heating process, while the height exceeds 6,000 µm, the glass may not be straight flattened due to being excessively convex, even if the heating process is subjected.

The glass may be any glass commonly used in the related art. For example, the glass may be an alkali-free glass, soda lime glass, or chemically-strengthened glass. Preferably, the chemically-strengthened glass is used, in an aspect that a curved level of the glass by the contraction and/or expansion of the adhesive layer is low due to a high thermal expansion coefficient thereof, and the glass is easily straight flattened by the heating process to be described below. Further, in the above-described aspect, preferably, the chemically-strengthened glass has a strengthened layer formed thereon with a thickness of 1 to 45 µm.

The thickness of the glass is not particularly limited, and may be, for example, 0.5 to 1.5 mm. If the thickness thereof is less than 0.5 mm, the glass is excessively thin, whereby the glass may not sufficiently support the base film, while if it exceeds 1.5 mm, handling of the glass during the processes such as depositing, and exposing processes, etc., for forming the transparent electrode laminate may be difficult.

In the present disclosure, conceptually, the adhesive layer also includes a bonding layer in addition thereto, and the adhesive also includes a bond in addition thereto.

In the present invention, the adhesive layer may be formed by applying an adhesive or adhering an adhesive sheet on the surface of the glass.

The adhesive layer used in the present invention is not particularly limited, and may use an aqueous adhesive or an aqueous bond.

In addition, a liquid crystal polymer composition may be used as the adhesive. Since the heating process and the transparent electrode laminate forming process, which will be described below, are performed at a high temperature, solvent components contained in the adhesive may be vaporized, and thereby, smoothness of the base film adhered on the glass may be deteriorated. However, since the liquid crystal polymer composition has a high glass transition temperature, it is possible to suppress deterioration in smoothness of the base film due to the volatilization of the solvent components at a high temperature.

The liquid polymer composition includes a liquid polymer and a solvent.

The liquid polymer may use any liquid polymer commonly used in the related art without particular limitation thereof, and may use, for example, a polyester resin, epoxy resin, silicon resin, siloxane resin, or the like. These may be used alone or in combination of two or more thereof.

The solvent may use any solvent commonly used in the related art without particular limitation thereof, and may use, for example, dimethylacetamide (DMAC), dimethylformamide (DMF), N-methylpyrrolidone (NMP), tetrahydrofuran (THF), etc. These may be used alone or in combination of two or more thereof.

The glass transition temperature of the liquid polymer is not particularly limited, and may be, for example, 150 to 400° C., and preferably, 200 to 370° C. When the glass transition temperature thereof ranges from 150 to 400° C., the liquid polymer has excellent durability during the transparent electrode forming process to be described below.

The thickness of the adhesive layer is not particularly limited, and may be, for example, 5 to 100 μm. If the adhesive layer has a thickness of less than 5 μm, adhering of the base film may be difficult, and curved level of the glass is insignificant. If the adhesive layer has a thickness exceeding 100 μm, it may be difficult to control the curved level of the glass.

Figure 4:
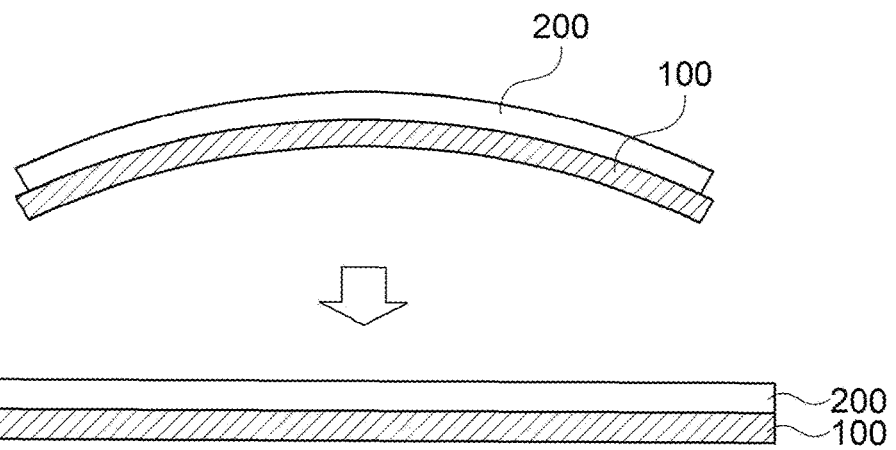
FIG. 4 is a cross-sectional view illustrating a process of flattening the convex portion of the glass by applying heat to an adhesive layer after forming the adhesive layer on the convex portion according to one embodiment of the present invention.

According to one embodiment of the present invention, as illustrated in FIG. 4, after forming an adhesive layer 200 on the convex portion of the glass, the convex portion of the glass may be flattened by applying heat to the adhesive layer.

A heating condition in the heating process after forming the adhesive layer is not particularly limited. For example, the heating process may be performed at a temperature of 60 to 300° C. for 60 to 1,800 seconds. When the heating temperature and time are within the above-described range, the convex portion of the glass may be straight flattened.

Then, a base film 300 is adhered on the adhesive layer 200.

The base film may use any base film so long as it is capable of minimizing a deformation which may be occur in the processes performing at a high temperature such as the transparent electrode laminate forming process and may have excellent thermal resistance, without particular limitation thereof, and may use for example, polyethyleneetherphthalate, polyethylenenaphthalate, polycarbonate, polyarylate, polyetherimide, polyethersulfonate, polyimide, or polyacrylate, but it is not limited thereto.

The thickness of the base film is not particularly limited, and may be, for example, 10 to 150 μm.

Figure 5:
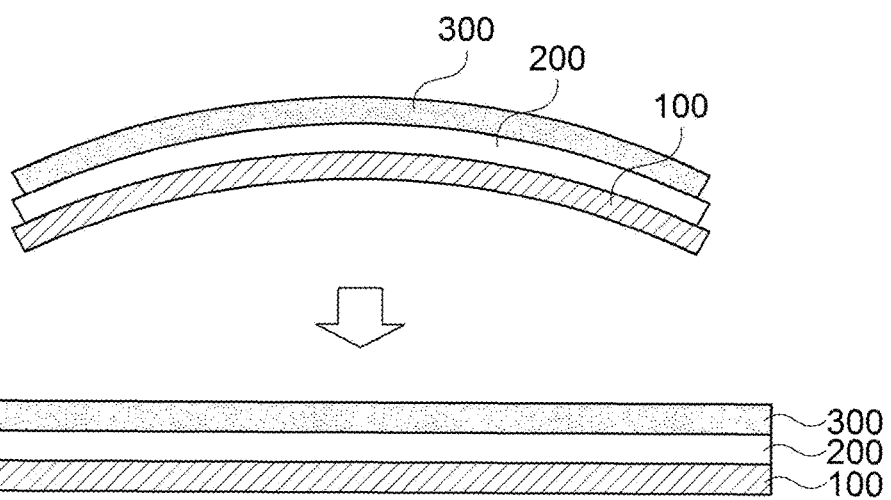
FIG. 5 is a cross-sectional view illustrating a process of flattening the convex portion of the glass by applying heat to the adhesive layer after forming the adhesive layer on the convex portion of the glass and adhering on a base film according to another embodiment of the present invention.

According to another embodiment of the present invention, as illustrated in FIG. 5, heat may be applied to the adhesive layer 200 after adhering the base 300, without applying heat to the adhesive layer 200 before adhering the base film 300 to the glass 100.

When adhering the base film 300 on the glass 100, the glass may also be curved (to a side becoming less convex) by the physical energy applied thereto during adhering. When adhering the base film 300 on the glass 100, and then applying heat to the adhesive layer 200, the glass may be more straight flattened by controlling curl than the case of applying heat before bending the glass (i.e., before adhering the base film 300).

The heating condition in the heating process after adhering the base film is not particularly limited. For example, the heating process may be performed at a temperature of 60 to 300° C. for 60 to 1,800 seconds. When the heating temperature and time are within the above-described range, the convex portion of the glass may be straight flattened.

Then, the transparent electrode laminate is formed on the base film 300.

The transparent electrode laminate may be formed so as to have various structures depending on a specific application. For example, the transparent electrode laminate may include first and second transparent electrode layers configured to provide positional information on coordinates of a point touched by a user, an insulation layer which is disposed between the first and second transparent electrode layers to electrically separated both layers from each other, contact holes which are formed in the insulation layer so as to electrically connect the first and second transparent electrode layers with each other and the like.

After forming the transparent electrode laminate, the base film is delaminated from the base film.

The delaminating process may be performed by any process known in the related art without particular limitation thereof. For example, the delaminating process may include a process of irradiating the adhesion layer with a laser, a non-laser process, for example, a process of fixing each of the base film and the glass to a jig, and applying a physical force thereto to separate from each other, or a separation process by air introduction; or a process of exposing at a low temperature of −20 to 15° C. or a high temperature of 100° C. or more, etc.

The base film having the transparent electrode laminate formed thereon may be combined to a display panel part so as to be used as a touch screen panel.

In addition, the method for fabricating a thin film touch screen panel further includes forming the glass in an arcuate spherical shape before forming the above-described adhesive layer.

The process of forming the glass in an arcuate spherical shape is not particularly limited, and may include, for example, a process of applying a composition for forming an insulation layer or a hard coating layer on one surface of the glass and heating the same.

The composition for forming an insulation layer or a hard coating layer may be any material including compositions known in the related art without particular limitation thereof. The composition for forming an insulation layer may use compositions for forming an organic insulation film, an inorganic insulation film, or an organic-inorganic hybrid type insulation film.

The heating condition in the heating process for forming the glass in an arcuate spherical shape is not particularly limited. For example, the heating process may be performed at a temperature of 60 to 300° C. for 60 to 1,800 seconds.

When the heating temperature and time are within the above-described range, the glass may be convexly formed in an arcuate spherical shape within the above-described range relating to the thickness and height of the glass.

Additionally, the glass may be formed in an arcuate spherical shape by chemically strengthening the glass, so that strengthened layers formed on both surfaces thereof have different thicknesses from each other. For example, the glass may be formed so that strengthened layers formed on both surfaces thereof have thicknesses different from each other in a range of 1 to 40 μm. When the glass having different thicknesses between both surfaces within the above-described range, the glass may be convexly formed in an arcuate spherical shape within the above-described range relating to the thickness and height of the glass.

Hereinafter, preferred embodiments are proposed to more concretely describe the present invention. However, the following examples are only given for illustrating the present invention and those skilled in the art will obviously understand that various alterations and modifications are possible within the scope and spirit of the present invention. Such alterations and modifications are duly included in the appended claims.

EXAMPLE

Example 1

A glass was chemically strengthened so that strengthened layers formed on both surfaces thereof have thicknesses different from each other in 10 μm, to prepare a chemically strengthened glass which is convex to one side thereof and has an arcuate spherical shape in a long axis direction with a thickness of 0.7 mm, as illustrated in FIG. 1. When the prepared glass is disposed in such a way that a convex surface thereof faces a bottom, a height of the glass from the bottom to the highest point of a surface on which the convex surface is formed was 800 μm.

The convex surface of the glass was applied with an aqueous adhesive composition in a thickness of 25 μm, and cured by applying heat at a temperature of 150° C. for 10 minutes.

Then, a polyimide film having a thickness of 50 μm was adhered on the glass by the adhesive to manufacture a laminate.

Example 2

A laminate was manufactured according to the same procedures as described in Example 1, except that heat was applied at a temperature of 150° C. for 30 minutes after applying the adhesive.

Example 3

A laminate was manufactured according to the same procedures as described in Example 1, except that a glass was chemically strengthened so that strengthened layers formed on both surfaces thereof have thicknesses different from each other in 45 μm, to prepare a chemically strengthened glass having a height of 6,200 μm from a bottom to the highest point of a surface on which the convex surface is formed, when the prepared glass is disposed in such a way that a convex surface thereof faces the bottom.

Example 4

A laminate was manufactured according to the same procedures as described in Example 1, except that a glass was chemically strengthened so that strengthened layers formed on both surfaces thereof have thicknesses different from each other in 1 μm, to prepare a chemically strengthened glass having a height of 100 μm from a bottom to the highest point of a surface on which the convex surface is formed, when the prepared glass is disposed in such a way that a convex surface thereof faces the bottom.

Example 5

A glass was chemically strengthened so that strengthened layers formed on both surfaces thereof have thicknesses different from each other in 10 μm, to prepare a chemically strengthened glass which is convex to one side thereof and has an arcuate spherical shape in a long axis direction with a thickness of 0.7 mm, as illustrated in FIG. 1. When the prepared glass is disposed in such a way that a convex surface thereof faces a bottom, a height of the glass from the bottom to the highest point of a surface on which the convex surface is formed was 800 μm.

The convex surface of the glass was applied with an aqueous adhesive composition in a thickness of 25 μm, and cured by applying heat at a temperature of 150° C. for 10 minutes to manufacture a laminate.

Example 6

A laminate was manufactured according to the same procedures as described in Example 5, except that heat was applied at a temperature of 320° C. for 30 minutes after applying the adhesive.

Example 7

One surface of a chemically strengthened glass having a thickness of 0.7 mm without bending was applied with a composition for forming a hard coating layer, and heat was applied at a temperature of 150° C. for 10 minutes to prepare a glass having a height of 800 μm from a bottom to the highest point of a surface on which the convex surface is formed, when the prepared glass is disposed in such a way that a convex surface thereof faces the bottom.

The convex surface of the glass was applied with an aqueous adhesive composition in a thickness of 25 μm, and cured by applying heat at a temperature of 150° C. for 10 minutes.

Then, a polyimide film having a thickness of 50 μm was adhered on the glass by the adhesive to manufacture a laminate.

Comparative Example 1

One surface of a chemically strengthened glass having a thickness of 0.7 mm without bending was applied with aqueous adhesive composition in a thickness of 25 μm, a polyimide film having a thickness of 50 μm was adhered thereon to manufacture a laminate.

Experimental Example: Measurement of Convex Level in Glass

Heights (h in FIG. 3) of the glasses prepared in the examples and comparative example from a bottom to the highest point of a surface on which the convex surface is formed were measured, when the glasses are disposed in such a way that a convex surface thereof faces the bottom. Measured results thereof are show in Table 1 below.

TABLE 1

| Section | h (μm) |
|---|---|
| Example 1 | 100 |
| Example 2 | 50 |
| Example 3 | 500 |
| Example 4 | 10 |
| Example 5 | 120 |
| Example 6 | 600 |
| Example 7 | 150 |
| Comparative Example 1 | 6,000 |

Referring the above Table 1, it can be seen that the laminates manufactured in Examples 1 to 7 have small values of height h so as to be straight flattened.

However, it can be seen that the laminate manufactured in Comparative Example 1 has a large value of height h so as to be largely curved.

What is claimed is:

1. A method for fabricating a thin film touch screen panel, the method comprising:
    forming an adhesive layer on a convex portion of an arcuate spherical-shaped glass;
    adhering a base film on the adhesive layer;
    flattening the convex portion of the arcuate spherical-shaped glass by applying heat to the adhesive layer after forming the adhesive layer or adhering the base film; and
    forming a transparent electrode laminate on the base film,
    wherein the heat is applied after forming the adhesive layer at a temperature of 60 to 300° C. for 60 to 1,800 seconds.

2. The method according to claim 1, wherein the arcuate spherical-shaped glass is convex to one side thereof, and has a multidirectional arcuate spherical shape.

3. The method according to claim 1, wherein the glass is an alkali-free glass, soda lime glass, or chemically-strengthened glass.

4. The method according to claim 3, wherein the chemically-strengthened glass has a strengthened layer formed thereon with a thickness of 1 to 45 μm.

5. The method according to claim 1, wherein, when the glass is disposed in such a way that a convex surface thereof faces a bottom, a height of the glass from the bottom to the highest point of a surface on which the convex surface is formed is 100 to 6,000 μm.

6. The method according to claim 1, wherein the heat is applied after adhering the base film at a temperature of 60 to 300° C. for 60 to 1,800 seconds.

7. The method according to claim 1, further comprising: applying a composition for forming an insulation layer or a hard coating layer on one surface of the glass and heating the same so as to form the glass in an arcuate spherical shape before forming the adhesive layer.

8. The method according to claim 1, further comprising: chemically strengthening the glass so that strengthened layers formed on both surfaces thereof have different thicknesses from each other so as to form the glass in an arcuate spherical shape before forming the adhesive layer.

9. The method according to claim 1, further comprising: delaminating the base film having the transparent electrode laminate formed thereon from the adhesive layer.

10. A method for fabricating a thin film touch screen panel, the method comprising:
    forming an adhesive layer on a convex portion of an arcuate spherical-shaped glass;
    adhering a base film on the adhesive layer;
    flattening the convex portion of the arcuate spherical-shaped glass by applying heat to the adhesive layer after forming the adhesive layer or adhering the base film; and
    forming a transparent electrode laminate on the base film,
    wherein the heat is applied after adhering the base film at a temperature of 60 to 300° C. for 60 to 1,800 seconds.

11. The method according to claim 10, wherein the arcuate spherical-shaped glass is convex to one side thereof, and has a multidirectional arcuate spherical shape.

12. The method according to claim 10, wherein the glass is an alkali-free glass, soda lime glass, or chemically-strengthened glass.

13. The method according to claim 12, wherein the chemically-strengthened glass has a strengthened layer formed thereon with a thickness of 1 to 45 μm.

14. The method according to claim 10, wherein, when the glass is disposed in such a way that a convex surface thereof faces a bottom, a height of the glass from the bottom to the highest point of a surface on which the convex surface is formed is 100 to 6,000 μm.

15. The method according to claim 10, further comprising: applying a composition for forming an insulation layer or a hard coating layer on one surface of the glass and heating the same so as to form the glass in an arcuate spherical shape before forming the adhesive layer.

16. The method according to claim 10, further comprising: chemically strengthening the glass so that strengthened layers formed on both surfaces thereof have different thicknesses from each other so as to form the glass in an arcuate spherical shape before forming the adhesive layer.

17. The method according to claim 10, further comprising: delaminating the base film having the transparent electrode laminate formed thereon from the adhesive layer.

* * * * *